(12) United States Patent
Takizawa et al.

(10) Patent No.: US 10,593,053 B2
(45) Date of Patent: Mar. 17, 2020

(54) PROJECTION PATTERN CREATION APPARATUS AND THREE-DIMENSIONAL MEASURING APPARATUS

(71) Applicant: FANUC CORPORATION, Yamanashi (JP)

(72) Inventors: Shouta Takizawa, Yamanashi (JP); Junichirou Yoshida, Yamanashi (JP); Fumikazu Warashina, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 11 days.

(21) Appl. No.: 15/719,962

(22) Filed: Sep. 29, 2017

(65) Prior Publication Data

US 2018/0101962 A1    Apr. 12, 2018

(30) Foreign Application Priority Data

Oct. 6, 2016    (JP) .................................. 2016-198377

(51) Int. Cl.
*G06T 7/521* (2017.01)
*H04N 9/31* (2006.01)
(Continued)

(52) U.S. Cl.
CPC .......... *G06T 7/521* (2017.01); *G01B 11/2513* (2013.01); *G06T 5/006* (2013.01);
(Continued)

(58) Field of Classification Search
CPC .................... G06T 7/521; G06T 5/006; G06T 2207/30208; G06T 2207/20008; H04N 9/3194; H04N 9/3185; G01B 11/2513
See application file for complete search history.

(56) References Cited

U.S. PATENT DOCUMENTS

| | | | |
|---|---|---|---|
| 2010/0195114 A1* | 8/2010 | Mitsumoto | G01B 11/245 356/601 |
| 2013/0088575 A1* | 4/2013 | Park | G06T 7/521 348/46 |
| 2013/0108104 A1 | 5/2013 | Sonoda et al. | |

FOREIGN PATENT DOCUMENTS

| | | |
|---|---|---|
| CN | 102611822 A | 7/2012 |
| CN | 105026997 A | 11/2015 |

(Continued)

*Primary Examiner* — Nam D Pham
(74) *Attorney, Agent, or Firm* — Hauptman Ham, LLP

(57) ABSTRACT

A projection pattern creation apparatus is configured to capture an image of a projection pattern projected from a pattern projection device by an imaging device to measure a three-dimensional position and/or a shape of an object. The projection pattern creation apparatus includes: a projection pattern deformation unit configured to reproduce deformation when a projected projection pattern is included in an image captured by the imaging device on the basis of characteristics of optical systems of the pattern projection device and the imaging device, and/or a positional relation between the pattern projection device and the imaging device and generate a deformation projection pattern; and a first projection pattern improvement unit configured to generate a second projection pattern obtained by improving a first projection pattern, on a basis of a first deformation projection pattern generated when the first projection pattern is projected toward evaluation surfaces having different positions and inclinations.

4 Claims, 18 Drawing Sheets

(51) Int. Cl.
    *G06T 5/00* (2006.01)
    *G01B 11/25* (2006.01)
(52) U.S. Cl.
    CPC ......... *H04N 9/3185* (2013.01); *H04N 9/3194* (2013.01); *G06T 2207/10152* (2013.01); *G06T 2207/20008* (2013.01); *G06T 2207/30208* (2013.01)

(56) References Cited

FOREIGN PATENT DOCUMENTS

| | | |
|---|---|---|
| DE | 102012220048 A1 | 5/2014 |
| JP | 2001-349713 A | 12/2001 |
| JP | 2008-32608 A | 2/2008 |
| JP | 2011-128117 A | 6/2011 |
| JP | 5322206 B2 | 10/2013 |
| JP | 2014-199193 A | 10/2014 |
| JP | 2016-53481 A | 4/2016 |
| JP | 2016-61567 A | 4/2016 |

* cited by examiner

PROJECTION PATTERN CREATION APPARATUS AND THREE-DIMENSIONAL MEASURING APPARATUS

RELATED APPLICATIONS

The present application claims priority to Japanese Patent Application No. 2016-198377 filed Oct. 6, 2016, the disclosure of which is hereby incorporated by reference herein in its entirety.

BACKGROUND OF THE INVENTION

1. Field of the Invention

The invention relates to a projection pattern creation apparatus and a three-dimensional measuring apparatus, and more particularly, to a projection pattern creation apparatus that generates a pattern in consideration of an influence of pattern deformation, and a three-dimensional measuring apparatus that uses the generated pattern.

2. Description of the Related Art

A three-dimensional measuring apparatus for measuring a three-dimensional shape of an object comprises a pattern projection device and an imaging device, and projects a pattern to an object from the pattern projection device, captures an image of an appearance of the object with the imaging device, and processes the captured image to measure the three-dimensional shape of the object.

To obtain the three-dimensional shape of the object, it is necessary to obtain a correspondence relation between images or between an image and a pattern by using geometrical features of the pattern in the image. Therefore, a pattern to be projected is an important factor for determining the performance of the three-dimensional measuring apparatus.

Various types of three-dimensional measuring apparatuses are proposed. Especially, a three-dimensional measuring apparatus capable of measuring an object with one pattern has advantages in performing measurement in a short time because the three-dimensional measuring apparatus only needs to capture an image of a pattern once and can measure a moving object.

When a pattern is projected to an object from the pattern projection device, and then an image of the pattern is captured by the imaging device, the pattern included in the captured image is affected by: an optical system of the pattern projection device or the imaging device; a relative positional relation between the object and the pattern projection device/the imaging device, and the shape of the object. Therefore, the pattern looks deformed. Due to the influence of the pattern deformation, the three-dimensional shape of the object may not be measured correctly.

The pattern projection device projects the clearest pattern at a focused position. FIG. 1 illustrates an example of a pattern projected by the pattern projection device in the related art. As illustrated in FIG. 1, the fine lattices can be identified even though the size of a pattern is reduced from (1) to (8).

As the pattern projection device is separated from a focused position, the projected pattern is more blurred. Similarly, the imaging device also captures an image of the clearest pattern at a focused position, and as the imaging device is separated from the focused position, a blurred image is captured.

FIG. 2 illustrates an example of a blurred pattern projected by the pattern projection device in the related art. As illustrated in FIG. 2, when a pattern is fine and separated from a focus position, the fine lattices sire blurred, and it is not possible to discriminate the shape of the pattern.

When an object has an uneven surface or when an object is inclined to the three-dimensional measuring apparatus, a pattern included in an image may be stretched or squashed, depending on a relative relation between the pattern projection device/the imaging device and the surface of the object.

FIG. 3 illustrates an example of a positional relation between the pattern projection device/imaging device and an object in the related art. Furthermore, FIG. 4 illustrates an example when a pattern projected by the pattern projection device in the related art is stretched. For example, when a pattern projection device 1, an imaging device 2, and an object 31 have a relative relation as illustrated in FIG. 3, a pattern included in an image is stretched in a horizontal direction as illustrated in FIG. 4. As the pattern is stretched, it is necessary to process the image in a wide range in order to identify the pattern.

FIG. 5 illustrates another example of a positional relation between the pattern projection device/imaging device and an object in the related art. Furthermore, FIG. 6 illustrates an example of squashed pattern of an object projected by the pattern projection device in the related art. When a pattern projection device 1, an imaging device 2, and an object 32 have a relative positional relation as illustrated in FIG. 5, a pattern included in an image is squashed in a horizontal direction as illustrated in FIG. 6. When a pattern is squashed, discriminating fine patterns is difficult, making it impossible to measure a three-dimensional shape.

So far, there are proposed various three-dimensional measuring apparatuses that perform measurement with one pattern.

For example, there is proposed a three-dimensional measuring apparatus that simultaneously projects two different patterns to an object, resolves a captured image into two frequencies, and captures an image, thereby performing three-dimensional measurement by one-time imaging (e.g., Japanese Laid-open Patent Publication No. JP-A-2001-349713).

The aforementioned technique has a problem that it is not possible to correctly perform measurement when blur occurs in a pattern included in an image.

In addition, there is a proposed three-dimensional measuring apparatus that collects a projection pattern for performing rough positioning and a projection pattern for precisely obtaining a three-dimensional point into one projection pattern, and performs pattern projection once, thereby performing three-dimensional measurement (e.g., Published Japanese Patent No. JP-B-5322206).

Blur patterns, stretched patterns, and squashed patterns are not considered in the techniques mentioned above. Therefore, it is necessary to roughen a pattern included in an image to the extent that the pattern can be discriminated even though the pattern is blurred or squashed, add a stretched part of the pattern, process a wide range of the image, and obtain a three-dimensional shape. This leads to a problem that it is not possible to enhance spatial resolution and to measure a fine shape on a measurement object, and a measurement range of a depth direction is narrow.

Furthermore, there is a proposed three-dimensional measuring apparatus that adds a pattern for identifying a stripe to both sides of a stripe pattern, thereby measuring a three-dimensional shape (e.g., Japanese Laid-open Patent Publication No. JP-A-2014-199193). The added pattern is symmetrical to each other with respect to the stripe, so that the center position of the stripe is not shifted even though blur of a pattern or a change in a gray value occurs. However, since the added pattern for identifying the stripe is very fine and it is not possible to discriminate the strip when the added pattern is blurred, there is a problem that only slight blur of a pattern can be permitted.

SUMMARY OF THE INVENTION

An object of the invention is to provide a projection pattern creation apparatus and a three-dimensional measuring apparatus configured to measure a three-dimensional shape even though a projected pattern is blurred, stretched, or squashed.

A projection pattern creation apparatus according to an example is a projection pattern creation apparatus configured to create a projection pattern used by a three-dimensional measuring apparatus including a pattern projection device and one or more imaging devices and configured to capture an image of a projection pattern projected to an object from the pattern projection device by the one or more imaging devices and measure a three-dimensional position and/or a shape of the object. The projection pattern creation apparatus includes: a projection pattern deformation unit configured to reproduce deformation when the projection pattern projected from the pattern projection device toward an evaluation surface provided in a projection range of the projection pattern creation apparatus is included in an image captured by the one or more imaging devices, on the basis of characteristics of an optical system of the pattern projection device, characteristics of an optical system of the one or more imaging devices, and/or a positional relation between the pattern projection device and the one or more imaging devices and generate a deformation projection pattern; and a first projection pattern improvement unit configured to generate a second projection pattern obtained by improving a first projection pattern, on the basis of one or more first deformation projection patterns generated when the first projection pattern is projected from the pattern projection device toward one or more evaluation surfaces having different positions and inclinations for the pattern projection device or the one or more imaging devices.

BRIEF DESCRIPTION OF THE DRAWINGS

The objects, features and advantages of the present invention will become more apparent from the following description of the embodiments in connection with the accompanying drawings, wherein.

DETAILED DESCRIPTION

Hereinafter, a projection pattern creation apparatus and a three-dimensional measuring apparatus according to the invention are described with reference to the drawings.

Figure 1:
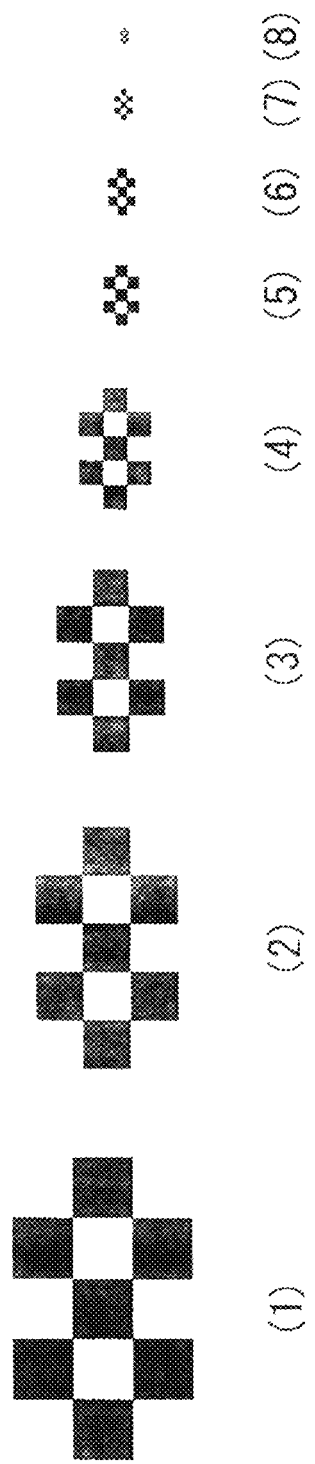
FIG. 1 is a diagram illustrating an example of a pattern projected by the pattern projection device in the related art.
Figure 2:
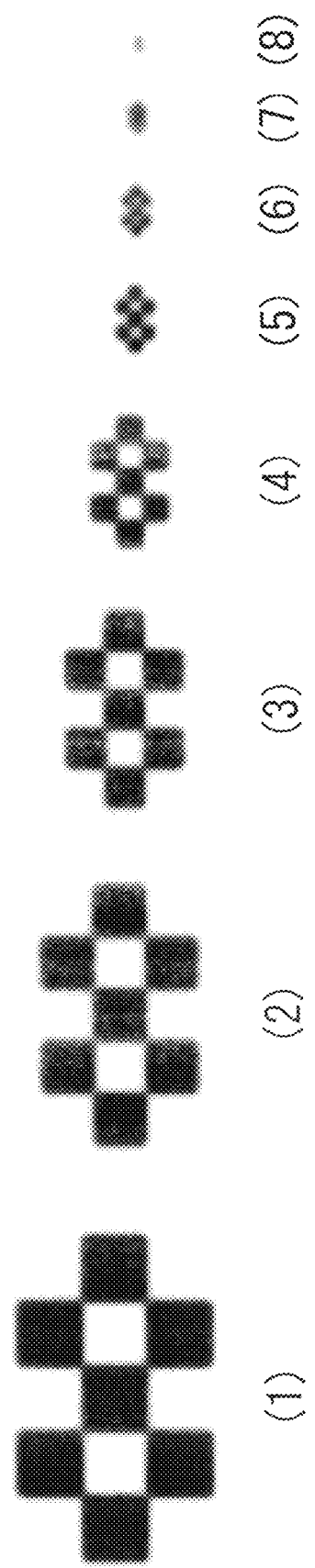
FIG. 2 is a diagram illustrating an example when a pattern projected by the pattern projection device in the related art is blurred.
Figure 3:
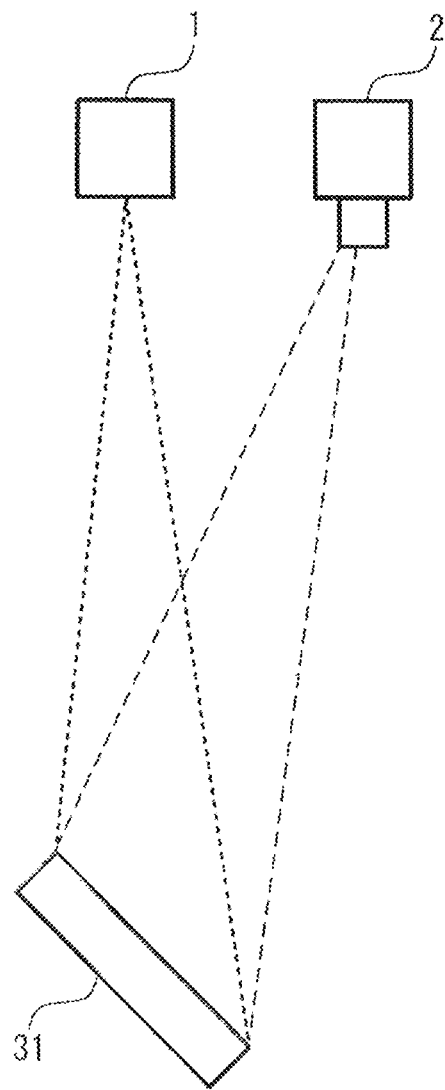
FIG. 3 is a diagram illustrating an example of a positional relation between the pattern projection device/imaging device and an object in the related art.
Figure 4:
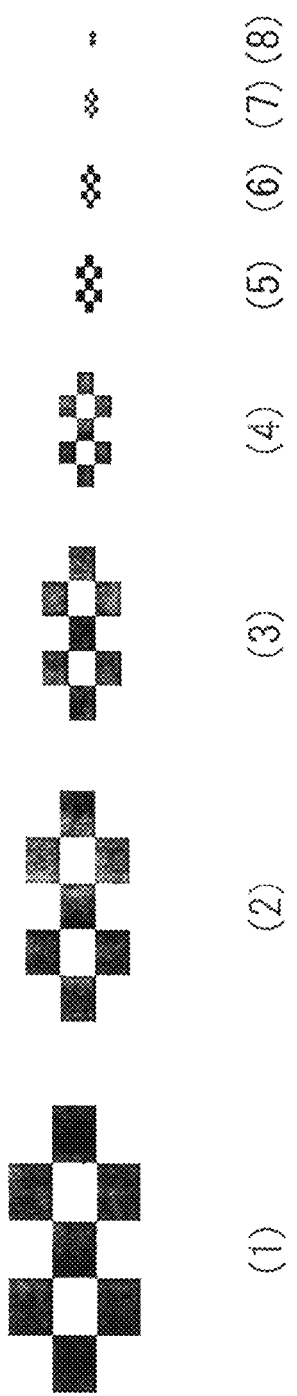
FIG. 4 is a diagram illustrating an example when a pattern projected by the pattern projection device in the related art is stretched.
Figure 5:
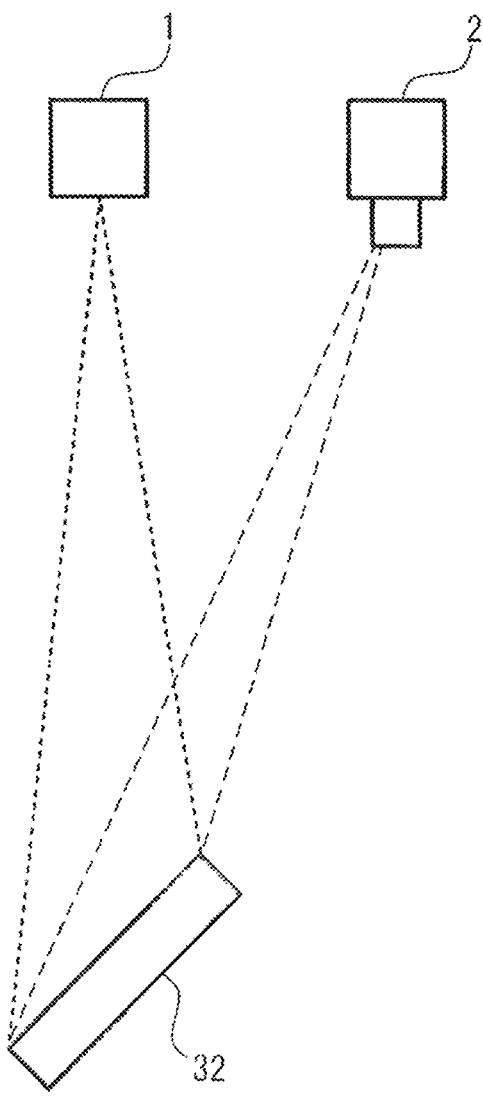
FIG. 5 is a diagram illustrating another example of a positional relation between the pattern projection device/imaging device and an object in the related art.
Figure 6:
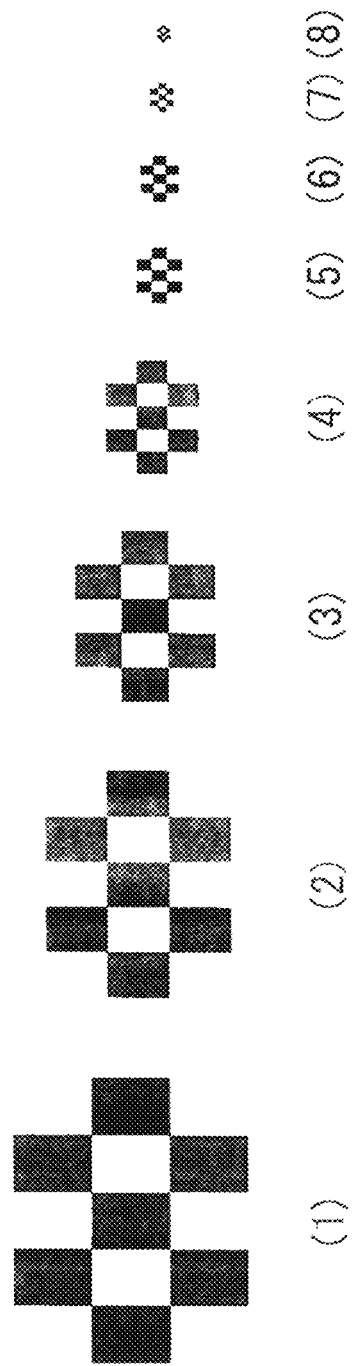
FIG. 6 is a diagram illustrating an example when a pattern projected by the pattern projection device in the related art is squashed.
Figure 7:
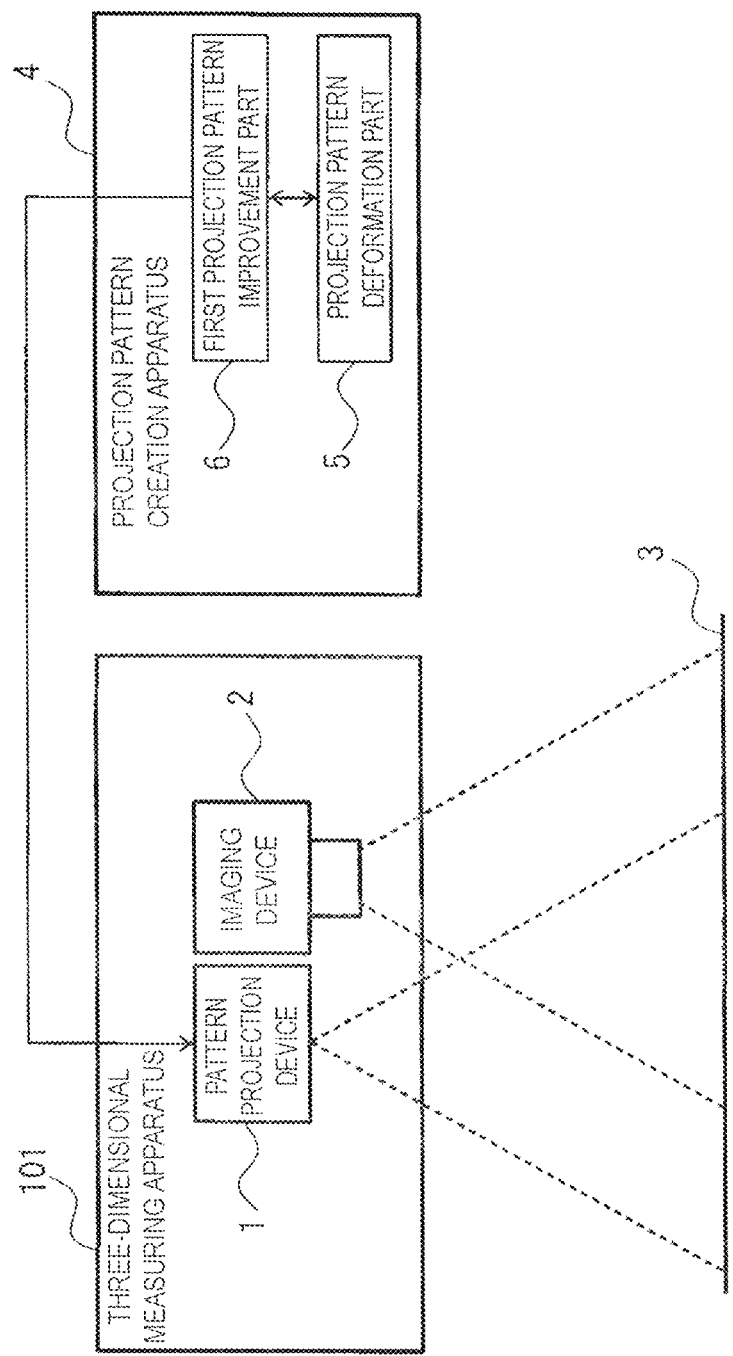
FIG. 7 is a diagram illustrating a configuration of a projection pattern creation apparatus according to a first embodiment.

A projection pattern creation apparatus according to a first embodiment is described. FIG. 7 illustrates a configuration of the projection pattern creation apparatus according to the first embodiment. The projection pattern creation apparatus 4 according to the first embodiment creates a projection pattern to be used by a three-dimensional measuring apparatus 101. The three-dimensional measuring apparatus 101 includes a pattern projection device 1 and one or more imaging devices 2, and measures a three-dimensional position and/or a shape of an object by allowing the imaging devices 2 to capture an image of a projection pattern projected to the object from the pattern projection device 1.

As illustrated in FIG. 7, the projection pattern creation apparatus 4 includes a projection pattern deformation unit 5 and a first projection pattern improvement unit 6. Furthermore, a reference numeral 3 represents an evaluation surface on which the object is arranged.

On the basis of characteristics of an optical system of the pattern projection device 1, characteristics of an optical system of the imaging device 2, and/or a positional relation between the pattern projection device 1 and the imaging device 2, the projection pattern deformation unit 5 reproduces deformation when the projection pattern projected from the pattern projection device 1 toward the evaluation surface 3 provided in a projection range of the projection pattern creation apparatus 4, is included in an image captured by the imaging device 2 and generate a deformation projection pattern.

The first projection pattern improvement unit 6 generates a second projection pattern obtained by improving a first projection pattern, on the basis of one or more first deformation projection patterns generated when the first projection pattern is projected from the pattern projection device 1 toward one or more evaluation surfaces 3 having different positions and inclinations for the pattern projection device 1 or the imaging device 2. The second projection pattern created in the projection pattern creation apparatus 4 is projected from the pattern projection device 1.

Preferably, the projection pattern deformation unit 5 generates a first deformation projection pattern obtained by reproducing deformation caused by the optical system of the pattern projection device 1 and/or the optical system of the imaging device 2, and the first projection pattern improvement unit 6 calculates a first evaluation value on the basis or the first deformation projection pattern and improves the first projection pattern on the basis of the first evaluation value.

Moreover, preferably, the projection pattern deformation unit 5 generates a second deformation projection pattern obtained by reproducing deformation caused by a positional relation between the pattern projection device 1 and the imaging device 2, and the first projection pattern improvement unit 6 calculates the first evaluation value on the basis of the second deformation projection pattern and improves the first projection pattern on the basis of the first evaluation value.

The three-dimensional measuring apparatus 101 includes the pattern projection device 1 and the imaging device 2. The pattern projection device 1 and the imaging device 2 may be accommodated in an integrated case, or may also be accommodated in separate cases. One or more imaging devices 2 may be provided for the pattern projection device 1. The projection pattern creation apparatus 4 may be accommodated in the same case as the pattern projection device 1 or the imaging device 2, or may also be accommodated in a separate case.

As the pattern projection device 1, a device employing an arbitrary scheme can be used. For example, there is a pattern projection device using the following configuration.

A liquid crystal, a Micro Electro Mechanical Systems (MEMS) device, or a photomask is used.

A lamp or a LED is used as a light source.

A wavelength of visible light, infrared light, or ultraviolet light can be used as a wavelength of a light source.

As the imaging device 2, a device employing an arbitrary scheme can be used. For example, the imaging device includes the followings:

A color camera

A gray scale camera

A camera capable of capturing an image by using light other than visible light such as infrared light, or ultraviolet light, as a light source.

The second projection pattern is generated by the following procedure. Details are described later.

When a three-dimensional shape of an object can be measured, a pattern generated by an arbitrary method such as a method using random dots or a de Brujin sequence is employed as an initial value of a projection pattern.

Quantity whether it is possible to perform three-dimensional measurement with the projection pattern and obtain an evaluation value A. An example of a method for calculating the evaluation value A is described later.

Calculation similar to that of the evaluation value A is performed with a deformation projection pattern obtained by intentionally blurring the projection pattern, and the calculation result is employed as an evaluation value B. An example of a method for blurring the projection pattern is described later.

Calculation similar to that of the evaluation value A is performed with a deformation projection pattern obtained by intentionally stretching the projection pattern, and the calculation result is employed as an evaluation value C. An example of a method for stretching the projection pattern is described later.

Calculation similar to that of the evaluation value A is performed with a deformation projection pattern obtained by intentionally squashing the projection pattern, and the calculation result is employed as an evaluation value D. An example of a method for squashing the projection pattern is described later.

By repeating an operation for correcting the projection pattern to reduce a sum value E obtained by adding one or more evaluation values B, C, and D to the evaluation value A and obtaining the sum value E again, the projection pattern is improved. An example of a method for improving the projection pattern is described later.

Figure 8:
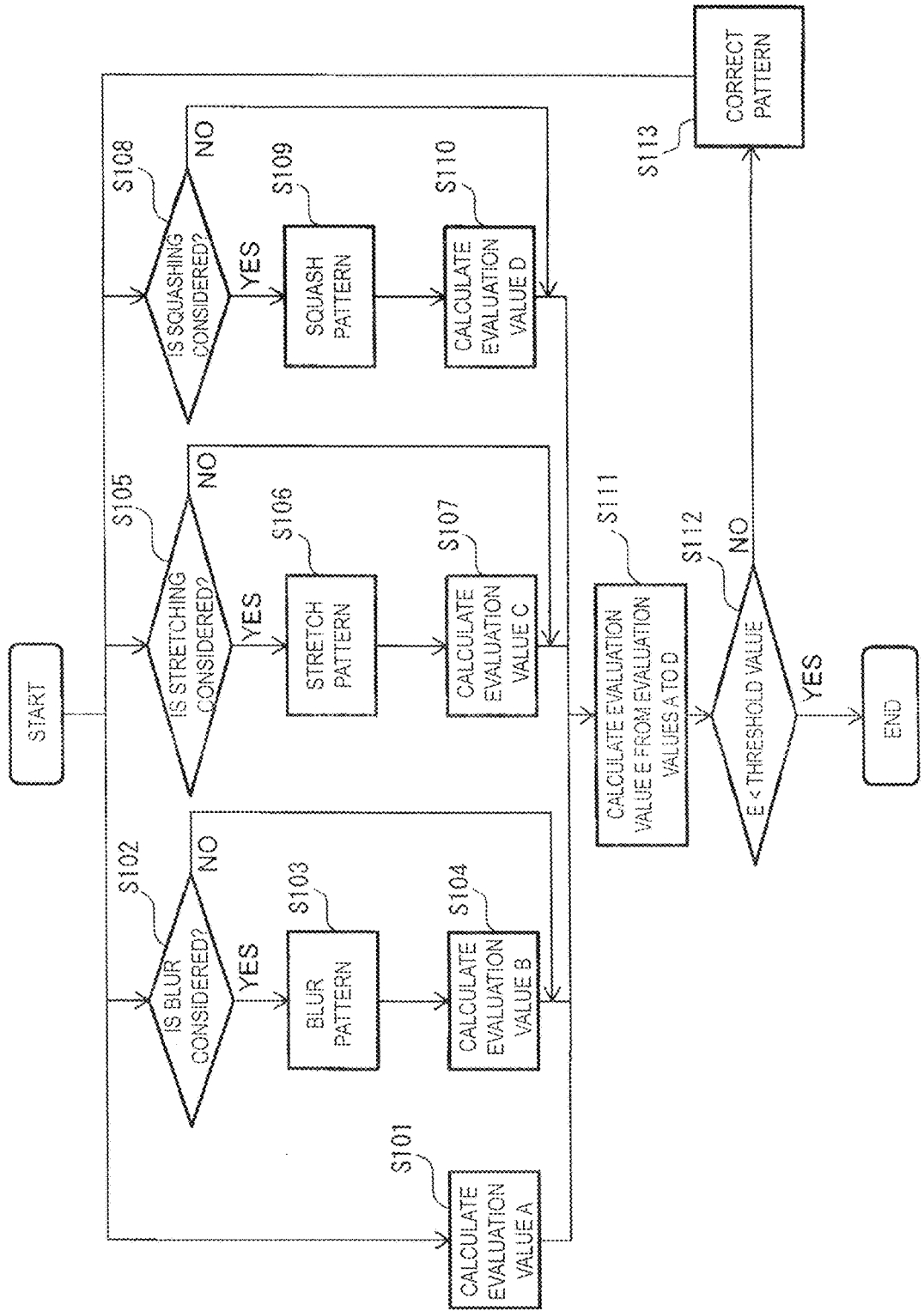
FIG. 8 is a flowchart for explaining a pattern creation procedure by a projection pattern creation apparatus according to the first embodiment.

Next, a procedure for creating the second projection pattern by the projection pattern creation apparatus 4 according to the example 1 is described using a flowchart illustrated in FIG. 8.

In step S101, the evaluation value A is calculated. An example of a calculation method of the evaluation value A is illustrated.

In the case where the three-dimensional measuring apparatus 101 performs three-dimensional measurement, when pre-processing such as edge extraction, smoothing, and Fourier transform is performed for an image captured by the imaging device 2, the evaluation value A is obtained after the pre-processing is performed for the projection pattern.

The evaluation value A can be obtained by an arbitrary calculation method according to a three-dimensional measurement method. For example, there is the following calculation method.

In the case of performing three-dimensional measurement by detecting a specific geometrical pattern such as a vertical stripe, a ratio of an area, where the specific geometrical pattern is not detectable, to the projection pattern is calculated as the evaluation value A.

When recognition of an order relation of a geometrical pattern is required in three-dimensional measurement, a ratio, in which the order relation for the projection pattern is not correctly obtained, is calculated as the evaluation value A.

In the case of performing three-dimensional measurement by using the fact that there is no repetition in the projection pattern, differences between target small regions of the projection pattern and different small regions are calculated for all combinations, and a maximum difference, the total sum of the differences, or a mean of the differences is calculated as the evaluation value A. Note that when there is no repetition of the projection pattern only in a specific direction or there is no repetition in a certain range for a target region, calculation is performed in a range in which there is no repetition.

When a plurality of three-dimensional measurement methods are combined with each other, respective evaluation values may be calculated and the evaluation value A may be determined to be the sum of the evaluation values.

Next, in step S102, it is determined whether blur of the projection pattern is considered, and when the blur of the projection pattern is considered, the projection pattern is blurred in step S103 and the evaluation value B is calculated in step S104. On the other hand, when the blur of the projection pattern is not considered, step S103 and step S104 are not performed.

An example of a method for blurring the projection pattern is described. In one method for blurring the projection pattern, a high frequency component of the projection pattern is removed using a low pass filter. When the low pass filter is used, it is possible to reproduce the case where the projection pattern is projected at a position separated from a focused position of the imaging device.

In another method for blurring the projection pattern, a blurred pattern is generated in consideration of the optical system of the pattern projection device 1. For example, when projecting a black and white pattern as illustrated in FIG. 9A and FIG. 9B, the white part is irradiated with light from the pattern projection device 1, but the black part is not irradiated with the light from the pattern projection device 1.

When spot light is projected from the pattern projection device 1, the projected spot has the smallest spot diameter at a focused position, and the spot diameter is larger as the projected spot is separated from the focused position. Therefore, as the projected projection pattern is separated from the focused position, the white part of the projection pattern is expanded and thus blur occurs.

Figure 9A:
FIG. 9A is a diagram illustrating an example of a pattern created by a projection pattern creation apparatus according to the first embodiment.
Figure 9B:
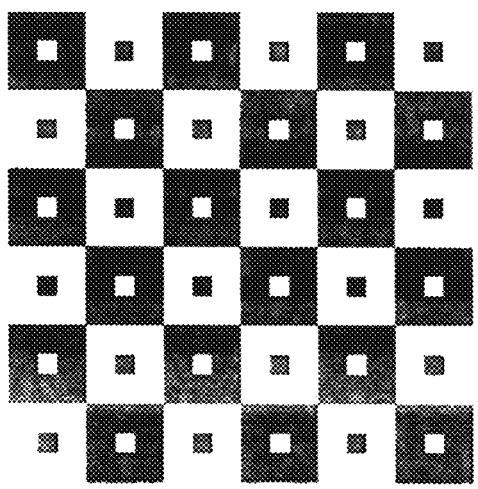
FIG. 9B is a diagram illustrating an example of a pattern created by a projection pattern creation apparatus according to the first embodiment.
Figure 10A:
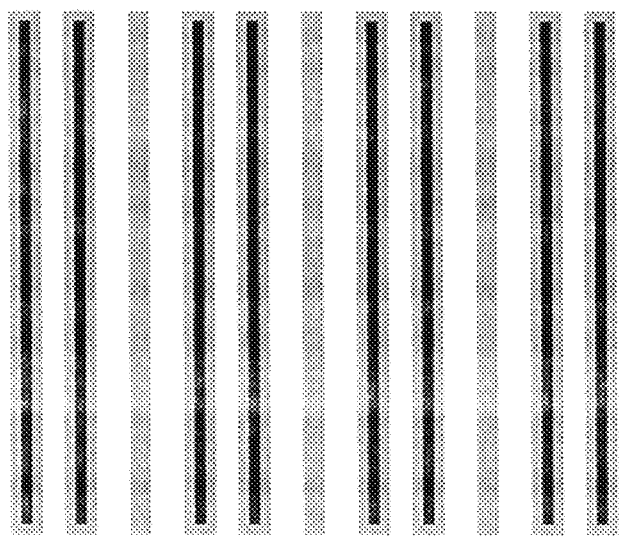
FIG. 10A is a diagram illustrating another example of a pattern created by a projection pattern creation apparatus according to the first embodiment.
Figure 10B:
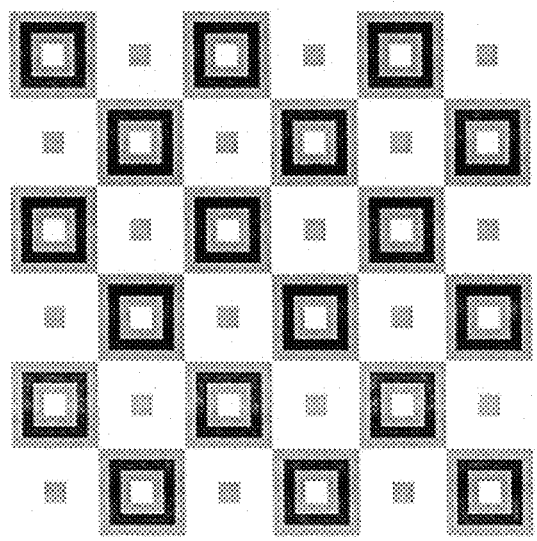
FIG. 10B is a diagram illustrating another example of a pattern created by a projection pattern creation apparatus according to the first embodiment.

When the blur occurs in the projection pattern as illustrated in FIG. 9A and FIG. 9B, the projection pattern reaches states as illustrated in FIG. 10A and FIG. 10B. Since the white part is expanded to the black part, a gray region occurs at the black side of the black and white boundary. Therefore, it is difficult to discriminate a fine black shape due to the gray. On the other hand, since the white part is expanded, the white part is less likely to lose its fine shape.

Therefore, the gray value of the projection pattern is changed depending on a distance from the boundary line such that the black part of the projection pattern turns whiter as closer to the boundary line and turns blacker as farther from the boundary line, so that blur of the projection pattern can be reproduced.

When the projection pattern is not two gray scales of white and black but is a multi-level gray scale, a similar process is performed to a side having a small gray value at the respective boundary lines, so that blur of the projection pattern can be reproduced.

Furthermore, when the projection pattern is a color, a process is performed for each component, so that blur of the projection pattern can be reproduced.

When it is not possible to reproduce blur of the projection pattern using expansion of the white part of the projection pattern due to a difference of the optical system of the pattern projection device 1, an arbitrary process according to the optical system is performed, so that the blur of the projection pattern may be reproduced.

In the three-dimensional measurement, since an image captured by the imaging device 2 is processed, evaluation may be performed by applying a low pass filter and expansion of a white part of a pattern to the projection pattern. When a dominant factor of blur exists in the pattern projection device 1, only the expansion of the white part of the projection pattern may be applied for evaluation, or when the dominant factor exists in the imaging device 2, only the low pass filter may be applied to the projection pattern for evaluation.

In further another method for blurring the projection pattern, the projection pattern may be actually projected to any object (e.g., a plane) installed at a position separated from a focused position of the pattern projection device 1, an image of the projected projection pattern may be captured by the imaging device 2, and the captured image may be employed as a deformation projection pattern for evaluation.

Next, in step S105, it is determined whether stretching of the projection pattern is considered. When the stretching of the projection pattern is considered, the projection pattern is stretched in step S106 and the evaluation value C is calculated in step S107. On the other hand, when the stretching of the projection pattern is not considered, step S106 and step S107 are not performed.

Figure 11:
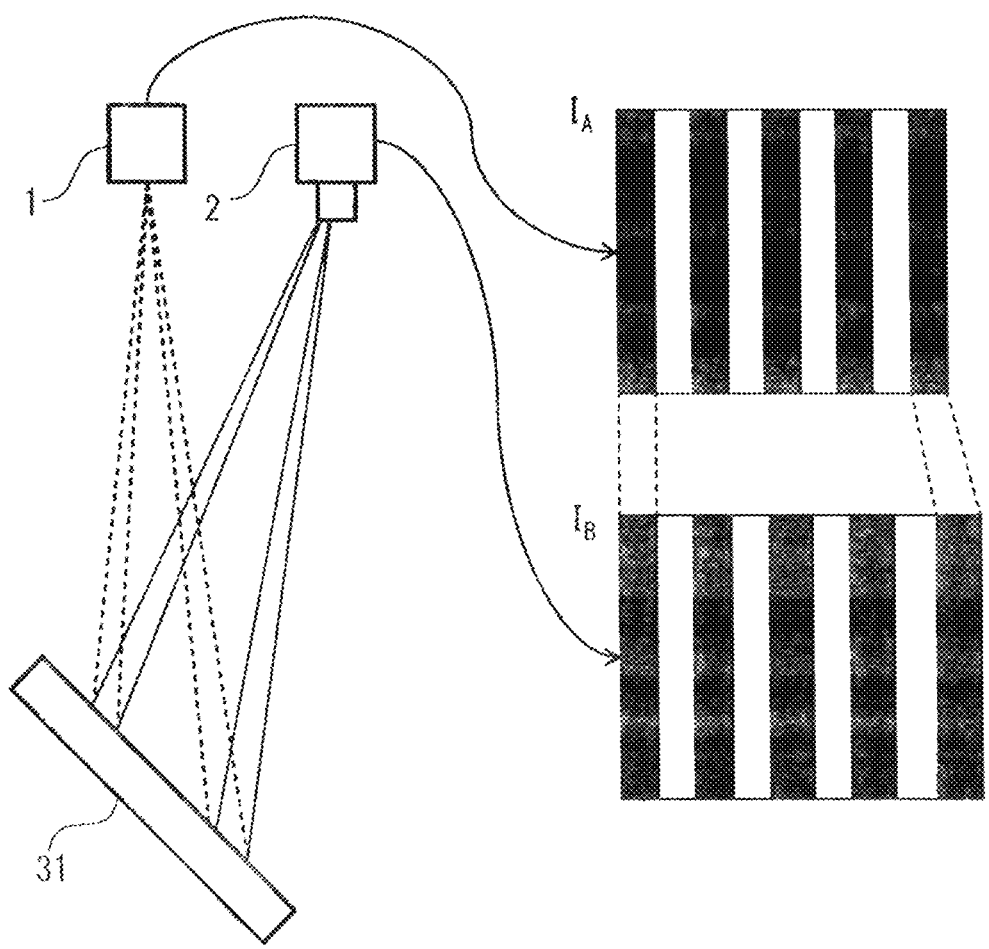
FIG. 11 is a diagram for explaining a method in which a pattern is stretched by a projection pattern creation apparatus according to the first embodiment.

Next, an example of a method for stretching the projection pattern is described. As one method for stretching the projection pattern, there is a method for generating a deformation projection pattern stretched in consideration of a relative relation among the pattern projection device 1, the imaging device 2, and the surface of an object to which a pattern is projected, and the optical systems of the pattern projection device 1 and the imaging device 2. For example, as illustrated in FIG. 11, when a pattern $I_A$ is projected to a surface 31 inclined with respect to the pattern projection device 1, a pattern projected to a surface remote from the pattern projection device 1 is more stretched in an image $I_B$ to be captured by the imaging device 2 as compared with a pattern projected to a surface near the pattern projection device 1.

From the numerical model of the optical system of the pattern projection device 1, the numerical model of the optical system of the imaging device 2, and a relative positional relation among the pattern projection device 1, the imaging device 2, and the surface to which the pattern is projected, the stretched deformation projection pattern can be calculated. Freely-selected numerical models may be used for the pattern projection device 1 and the imaging device 2 according to devices actually used. Furthermore, since the stretching of the projection pattern is changed depending on the relative positional relation, deformation projection patterns stretched in a plurality of different relative positional relations may be generated and used for evaluation.

In another method for stretching the projection pattern, the projection pattern is expanded in a certain direction. When the pattern $I_A$ is projected to a surface slightly inclined to the pattern projection device 1 or the imaging device 2, this method can approximately express the projection pattern included in an image captured by the imaging device 2. Since the process for stretching the projection pattern can be performed in a short time, it is advantageous that this method can shorten a time required for improving the projection pattern.

In further another method for stretching the projection pattern, the projection pattern may be actually projected to an inclined any object (e.g. a plane) from the pattern projection device 1, an image of the projected projection pattern may be captured by the imaging device 2, and the captured image may be employed as a deformation projection pattern for evaluation.

Next, in step S108, it is determined whether squashing of the projection pattern is considered. When the squashing of the projection pattern is considered, the projection pattern is squashed in step S109 and the evaluation value D is calculated in step S110. On the other hand, when the squashing of the projection pattern is not considered, step S109 and step S110 are not performed.

Figure 12:
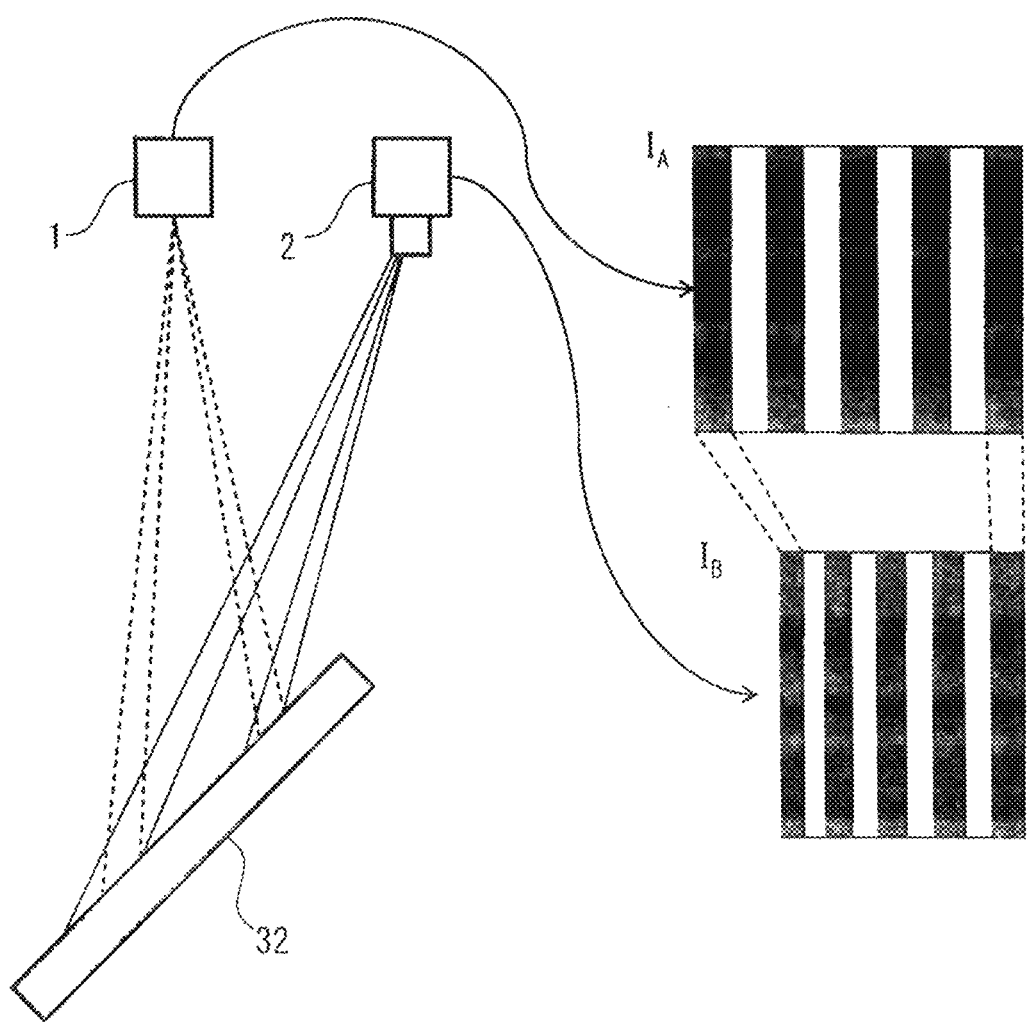
FIG. 12 is a diagram for explaining a method in which a pattern is squashed by a projection pattern creation apparatus according to the first embodiment.

Next, an example of a method for squashing the projection pattern is described. As one method for squashing the projection pattern, there is a method considering a relative relation among the pattern projection device 1, the imaging device 2, and the surface of an object to which the projection pattern is projected, and the optical systems of the pattern projection device 1 and the imaging device 2, similar to the case of stretching the projection pattern. For example, as illustrated in FIG. 12, when the pattern $I_A$ is projected to a surface 32 inclined with respect to the pattern projection device 1, a pattern projected to a surface remote from the pattern projection device 1 is more squashed in the image $I_B$ captured by the imaging device 2 as compared with a pattern projected to a surface near the pattern projection device 1.

By using the same technique as when calculating the stretched deformation projection pattern, the squashed projection pattern can be generated. Furthermore, deformation projection patterns squashed in a plurality of different relative relations may be used for evaluation.

In another method for squashing the projection pattern, the projection pattern is contracted in a certain direction. When the pattern $I_A$ is projected to a surface slightly inclined to the pattern projection device 1 or the imaging device 2, this method can approximately express the projection pattern included in an image captured by the imaging device. Since the process for squashing the projection pattern can be performed in a short time, it is advantageous that this method can shorten a time required for improving the projection pattern.

In yet another method for squashing the projection pattern, the projection pattern may be actually projected to any inclined object (e.g., a plane) from the pattern projection device 1, an image of the projected projection pattern may be captured by the imaging device 2, and the captured image may be employed as a deformation projection pattern for evaluation.

Next, in step S111, an evaluation value E is calculated. An example of a method for calculating the evaluation value E is described.

The evaluation value E can be calculated from the evaluation values A to D by using an arbitrary Equation. For example, there is the following method.

The sum of the evaluation values A to D is employed as the evaluation value E.

$$E=A+B+C+D$$

Weights $\alpha_A$ to $\alpha_D$ are multiplied to the evaluation values A to D respectively, thereby employing the multiplication result as the sum value E.

$$E=\alpha_A \times A+\alpha_B \times B+\alpha_C \times C+\alpha_D \times D$$

When calculating the evaluation value B, evaluation values calculated by blurring the projection pattern by the aforementioned plurality of different methods may be employed as $B_1$ to $B_n$, and the sum of $B_1$ to $B_n$ ($\Sigma B_i$) may be used as the evaluation value B.

Evaluation values $C_1$ to $C_n$ when stretching the projection pattern in n different conditions are calculated, and the sum of the n obtained evaluation values is employed as the evaluation value $C=\Sigma C_i$, so that the evaluation value E is obtained similarly to the above.

Evaluation values $D_1$ to $D_n$ when squashing the projection pattern in n different conditions are calculated, and the sum of the n obtained evaluation values is employed as the evaluation value $D=\Sigma D_i$, so that the evaluation value E is obtained similarly to the above.

The evaluation value E is not calculated using all of the evaluation values A to D, and the evaluation value E may be calculated using only A and B or only a part thereof.

Next, in step S112, it is determined whether the calculated evaluation value E is less than a predetermined threshold value. When the evaluation value E is less than the threshold value, the procedure is ended.

On the other hand, when the evaluation value E is equal to or greater than the threshold value, the projection pattern is corrected in step S113. FIG. 8 illustrates an example in which the process for blurring the projection pattern, the process for stretching the projection pattern, and the process for squashing the projection pattern are performed in parallel, i.e. in a parallel manner. However, the invention is not limited to such an example and the aforementioned processes may be sequentially performed, i.e. in a serial manner.

An example of a method for correcting the projection pattern is described. It is possible to correct the projection pattern by arbitrary methods such as maximum likelihood estimation, reinforcement learning, and a genetic algorithm. For example, there is the following method.

The boundary line of the projection pattern is subdivided and positions of the subdivided boundary lines are moved, so that the projection pattern is corrected. The boundary line may be selected by arbitrary methods. Examples of the method include a method for randomly selecting the boundary line, and a method for selecting the boundary line from a region causing an increase in the evaluation value E of the projection pattern.

The projection pattern is subdivided into small regions and white and black values of the respective small regions are changed, so that the projection pattern is corrected. The small region may be selected by arbitrary methods. Examples of the method include a method for randomly selecting the small region, and a method for selecting the small region from a region causing an increase in the evaluation value E of the projection pattern.

The projection pattern is expanded or contracted as a whole.

A plurality of small patterns are prepared in advance and arranged to express the projection pattern. The arrangement of the small patterns is changed, so that the projection pattern is corrected.

By so doing, the second projection pattern is generated in consideration of the influence of the blur, stretching, and squashing of the projection pattern, so that the generated second projection pattern can be used for three-dimensional measurement.

Figure 13:
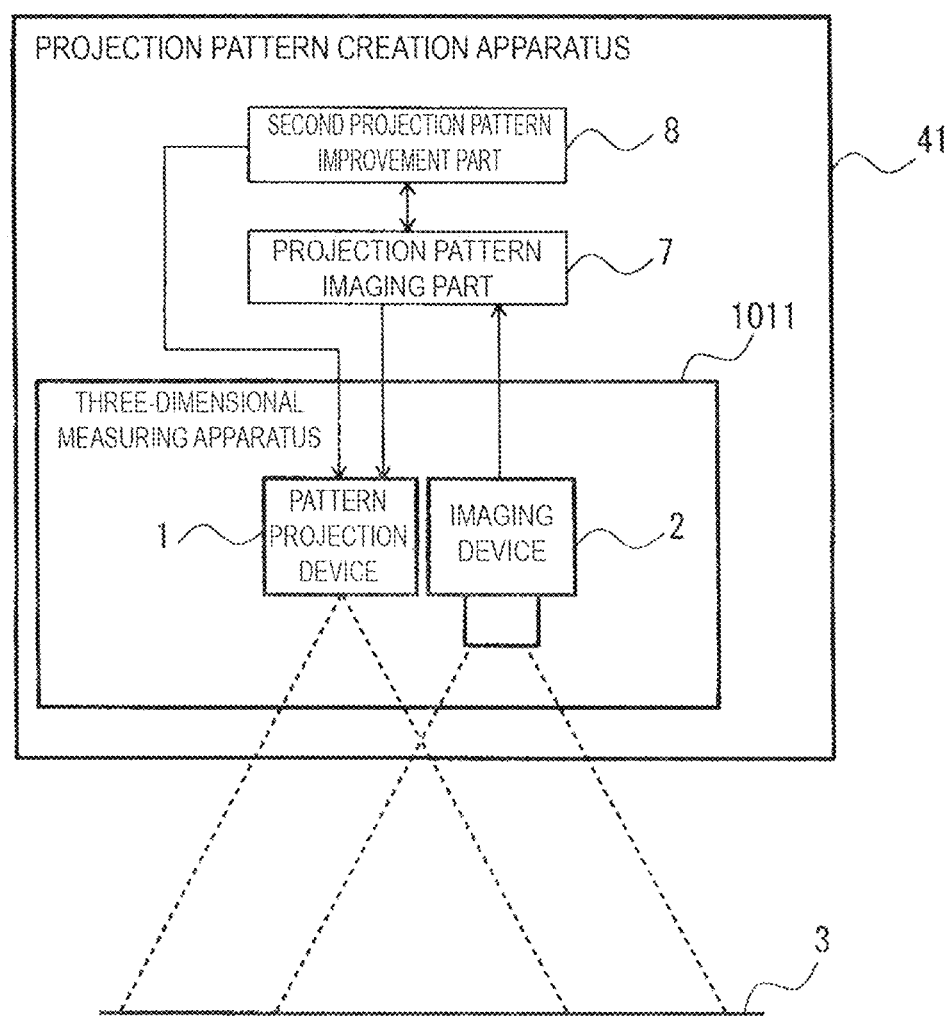
FIG. 13 is a diagram illustrating another configuration of a projection pattern creation apparatus according to the first embodiment.

Next, a modification example of the projection pattern creation apparatus according to the first embodiment is described. FIG. 13 illustrates another configuration of the projection pattern creation apparatus according to the first embodiment. The projection pattern creation apparatus 41 according to the modification example of the first embodiment creates a projection pattern to be used by a three-dimensional measuring apparatus 1101. The three-dimensional measuring apparatus 1011 includes a pattern projection device 1 and one or more imaging devices 2, and measures a three-dimensional position and/or a shape of an object by allowing the imaging devices 2 to capture an image of a projection pattern projected to the object from the pattern projection device 1.

The projection pattern creation apparatus 41 includes a projection pattern imaging unit 7 and a second projection pattern improvement unit 8.

The projection pattern imaging unit 7 allows the imaging device 2 to capture an image of a first projection pattern projected to the evaluation surface from the pattern projection device 1, the evaluation surface, to which a projection pattern is projected, being provided in front of the pattern projection device 1.

The second projection pattern improvement unit 8 generates a second projection pattern obtained by improving the first projection pattern, on the basis of one or more second deformation projection patterns included in an image captured by the imaging device 2 when the first projection pattern is projected from the pattern projection device 1 to one or more evaluation surfaces having different positions and inclinations for the pattern projection device 1 or the imaging device 2. The projection pattern creation apparatus 41 has the three-dimensional measuring apparatus 1011 therein. Therefore, the second projection pattern created in the projection pattern creation apparatus 41 can be projected from the projection pattern creation apparatus 41.

In accordance with the projection pattern creation apparatus according to the first embodiment, it is possible to measure objects having a depth and randomly located objects of which the separation distances are not known, without roughening spatial resolution or limiting a measurement range.

Figure 14:
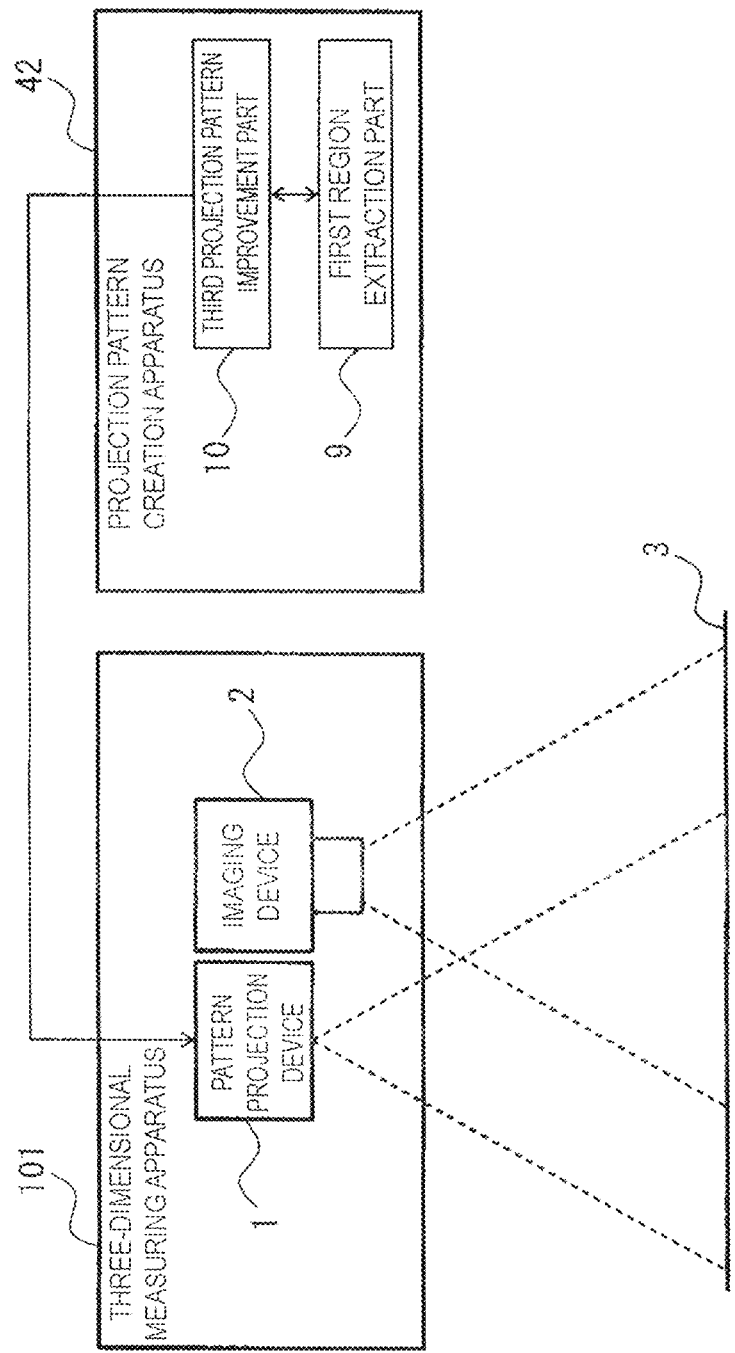
FIG. 14 is a diagram illustrating a configuration of a projection pattern creation apparatus according to a second embodiment.

Next, a projection pattern creation apparatus according to a second embodiment is described. FIG. 14 illustrates a configuration of the projection pattern creation apparatus according to the second embodiment. The projection pattern creation apparatus 42 according to the second embodiment is different from the projection pattern creation apparatus 4 according to the first embodiment in that the projection pattern creation apparatus 42 includes a first region extraction unit 9 and a third projection pattern improvement unit 10. Since the other configuration of the projection pattern creation apparatus 42 according to the second embodiment is similar to that of the projection pattern creation apparatus 4 according to the first embodiment, a detailed description thereof is omitted.

The first region extraction unit 9 extracts a region, which satisfies a first condition for determining an influence of deformation caused by at least one of the optical system of the pattern projection device 1 and/or the optical system of the imaging device 2, and a positional relation between the pattern projection device 1 and the imaging device 2, from a first projection pattern as a first correctable region.

The third projection pattern improvement unit 10 corrects a pattern in the first correctable region and generates a second projection pattern.

Figure 15:
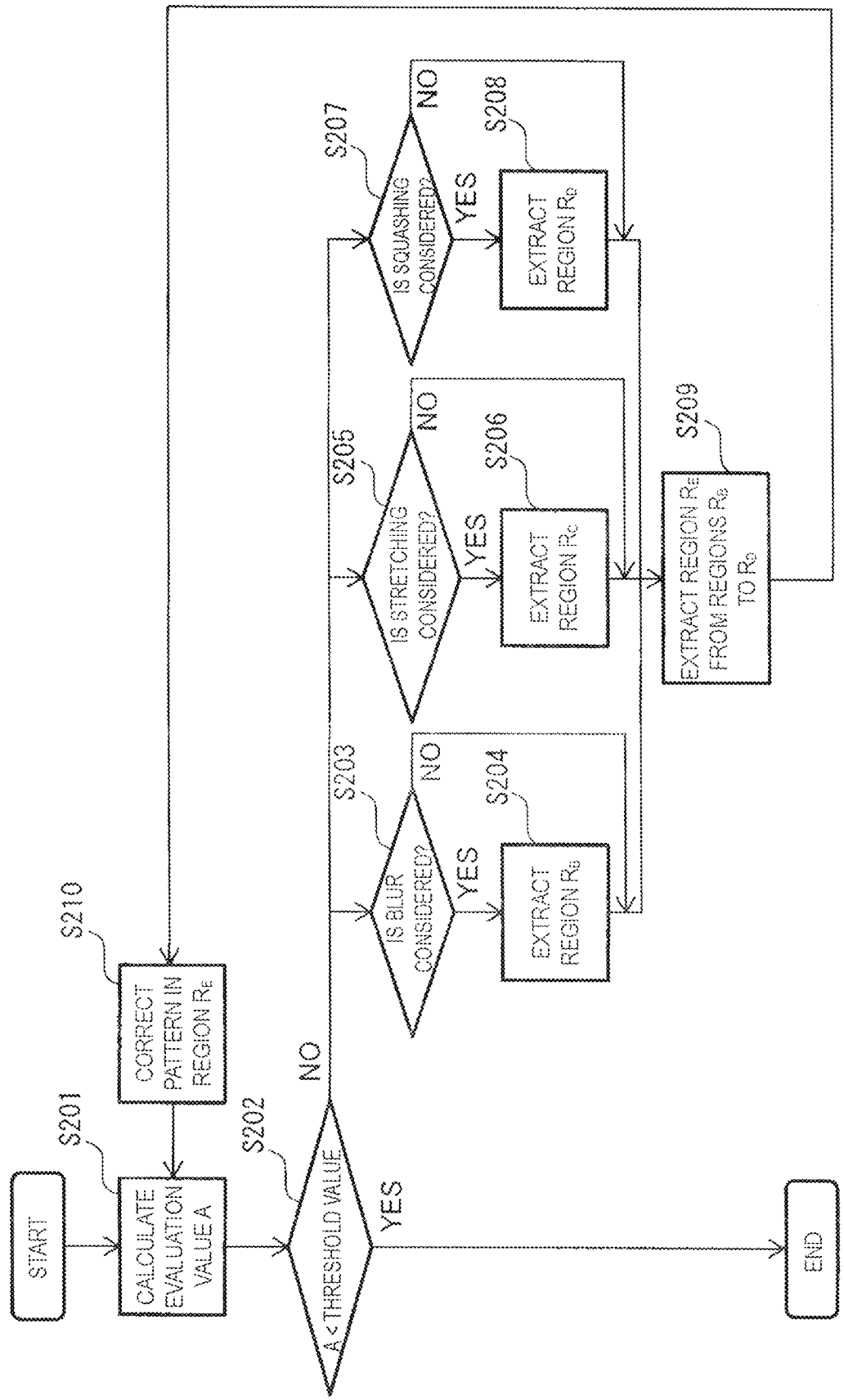
FIG. 15 is a flowchart for explaining a pattern creation procedure by a projection pattern creation apparatus according to the second embodiment.

Next, a procedure by which the second projection pattern is created by the projection pattern creation apparatus 42 according to the example 2 is described using a flowchart illustrated in FIG. 15.

In the first embodiment, the projection pattern is evaluated using the evaluation values considering the blur, stretching, and squashing of the projection pattern. On the other hand, in the second embodiment, evaluation of the projection pattern is performed with the evaluation value A, and correction of the projection pattern is limited in consideration of blur, stretching, and squashing, so that the projection pattern is improved.

In step S201, the evaluation value A is calculated. Next, in step S202, it is determined whether the evaluation value A is less than a predetermined threshold value. When the evaluation value A is less than the threshold value, the procedure is ended.

On the other hand, when the evaluation value A is equal to or greater than the threshold value, the projection pattern is corrected in the following procedure.

A condition B satisfied by a pattern tolerant of blur, a condition C satisfied by a pattern tolerant of stretching, and a condition D satisfied by a pattern tolerant of squashing are set in advance. Examples of the conditions B, C, and D are described later.

The projection pattern is divided into small regions, it is determined whether the condition B is satisfied in each small region, and when it is determined that the blur of the projection pattern is considered in step S203, a region $R_B$ tolerant of the blur is extracted (step S204). On the other hand, when it is determined that the blur of the projection pattern is not considered in step S203, the process of step S204 is not performed.

The projection pattern is divided into small regions, it is determined whether the condition C is satisfied in each small region, and when it is determined that the stretching of the projection pattern is considered in step S205, a region $R_C$ tolerant of the stretching is extracted (step S206). On the other hand, when it is determined that the stretching of the projection pattern is not considered in step S205, the process of step S206 is not performed.

The projection pattern is divided into small regions, it is determined whether the condition D is satisfied in each small region, and when it is determined that the squashing of the projection pattern is considered in step S207, a region $R_D$ tolerant of the squashing is extracted (step S208). On the other hand, when it is determined that the squashing of the projection pattern is not considered in step S207, the process of step S208 is not performed.

A region $R_E$ where the projection pattern is correctable is extracted from the extracted region $R_B$ to region $R_D$ (step S209). An example of the extraction method of the region $R_E$ is described later.

A pattern in the extracted region $R_E$ is corrected in the same method as the first embodiment such that the evaluation value A is reduced (step S210), and an operation for obtaining the region $R_E$ where the pattern is correctable again is repeated, so that the projection pattern is improved. FIG. 15 illustrates an example in which the process for extracting the region $R_B$ tolerant of the blur, the process for extracting the region $R_C$ tolerant of the stretching, and the process for extracting the region $R_D$ tolerant of the squashing are performed in parallel, i.e. in a parallel manner. However, the invention is not limited to such an example and the aforementioned processes may be sequentially performed, i.e. in a serial manner.

Next, examples of the aforementioned conditions B, C, and D are described.

An example of the condition B is described. As a condition satisfied by a pattern tolerant of the blur, for example, the following can be used as the condition B.

An interval between a boundary line and a boundary line being equal to or greater than a threshold value An area of the smallest black region being equal to or greater than a threshold value An area of the smallest white region being equal to or greater than a threshold value A change amount of a value on either side of a boundary line being equal to or greater than a threshold value Next, an example of the condition C is described. As a condition satisfied by a pattern tolerant of the stretching, for example, the following can be used as the condition C.

Sum of areas of white regions being equal to or less than a threshold value

Sum of areas of black regions being equal to or less than a threshold value

An interval between a boundary line and a boundary line being equal to or less than a threshold value An area of the smallest black region being equal to or less than a threshold value An area of the smallest white region being equal to or less than a threshold value Next, an example of the condition D is described. As a condition satisfied by a pattern tolerant of the squashing, for example, the following can be used as the condition D.

An interval between a boundary line and a boundary line being equal to or greater than a threshold value An area of the smallest black region being equal to or greater than a threshold value An area of the smallest white region being equal to or greater than a threshold value Next, the example of the extraction method of the region $R_E$ is described. The region $R_E$ may be extracted from the region $R_B$ to the region $R_D$ by using arbitrary methods. For example, there is the following method.

Logical addition of the region $R_B$ to the region $R_D$ is employed as the region $R_E$ Logical multiplication of the region $R_B$ to the region $R_D$ is employed as the region $R_E$ A region included in two or more of the region $R_B$ to the region $R_D$ is employed as the region $R_E$ In accordance with the projection pattern creation apparatus 42 according to the example 2, correction, of the projection pattern is limited in consideration of an influence of blur, stretching, or squashing, and the projection pattern is improved, so that it is possible to measure objects having a depth and randomly located objects of which the separation distances are not known, without roughening spatial resolution or limiting a measurement range.

Figure 16:
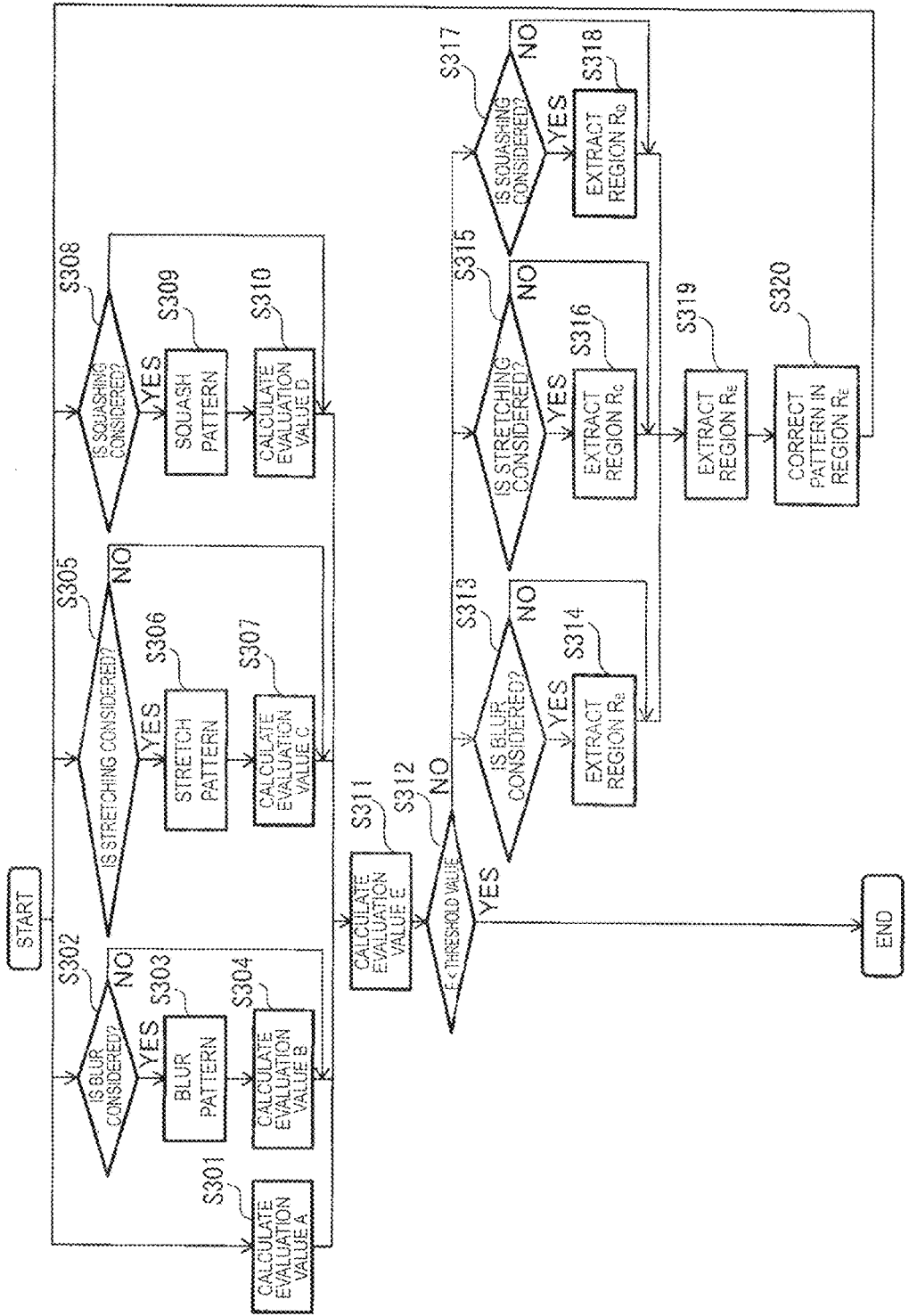
FIG. 16 is a flowchart for explaining a pattern creation procedure by a projection pattern creation device according to a third embodiment.

Next, a projection pattern creation apparatus according to a third embodiment is described. In the third embodiment, a projection pattern is improved through a combination of Examples 1 and 2. FIG. 16 is a flowchart for explaining a projection pattern creation procedure by a projection pattern creation apparatus according to the third embodiment. In FIG. 16, steps S301 to S312 correspond to steps S101 to S112 of the flowchart in the first embodiment, and steps S313 to S320 correspond to steps S203 to S210 of the flowchart in the second embodiment.

In accordance with the projection pattern creation apparatus according to the example 3, the projection pattern is improved in consideration of an influence of blur, stretching, or squashing, so that it is possible to measure objects having a depth and randomly located objects of which the separation distances are not known, without roughening spatial resolution or limiting a measurement range.

In accordance with the projection pattern creation apparatus and the three-dimensional measuring apparatus according to the present example, even if blur, stretching, or squashing of a projected pattern occurs, it is possible to perform three-dimensional measurement.

What is claimed is:

1. A projection pattern creation apparatus configured to create a projection pattern used by a three-dimensional measuring apparatus comprising a pattern projection device and one or more imaging devices and configured to capture an image of a projection pattern projected to an object from the pattern projection device by the one or more imaging devices and measure a three-dimensional position and/or a shape of the object, the projection pattern creation apparatus comprising:

a projection pattern deformation unit configured to reproduce deformation when the projection pattern projected from the pattern projection device toward an evaluation surface provided in a projection range of the pattern projection device is included in an image captured by the one or more imaging devices, on the basis of characteristics of an optical system of the pattern projection device, characteristics of an optical system of the one or more imaging devices, and/or a positional relation between the pattern projection device and the one or more imaging devices and generate a deformation projection pattern; and a first projection pattern improvement unit configured to generate a second projection pattern obtained by improving a first projection pattern, on a basis of one or more first deformation projection patterns generated when the first projection pattern is projected from the pattern projection device toward one or more evaluation surfaces having different positions and inclinations for the pattern projection device or the one or more imaging devices.

2. A three-dimensional measuring apparatus configured to project the second projection pattern from the pattern projection device, wherein the second projection pattern is created with the projection pattern creation apparatus according to claim 1.

3. The projection pattern creation apparatus according to claim 1, wherein:

the projection pattern deformation unit is configured to generate a first deformation projection pattern obtained by reproducing deformation of the projection pattern caused by the optical system of the pattern projection device and/or the optical system of the one or more imaging devices, and the first projection pattern improvement unit is configured to calculate a first evaluation value on the basis of the first deformation projection pattern and improves the first projection pattern on the basis of the first evaluation value.

4. The projection pattern creation apparatus according to claim 1, wherein:

the projection pattern deformation unit is configured to generate a second deformation projection pattern obtained by reproducing deformation of the projection pattern caused by a positional relation between the pattern projection device and the one or more imaging devices, and the first projection pattern improvement unit is configured to calculate a first evaluation value on the basis of the second deformation projection pattern and improves the first projection pattern on the basis of the first evaluation value.

* * * * *